United States Patent [19]

Gurbin

[11] 4,265,591
[45] May 5, 1981

[54] ADJUSTABLE PITCH FAN

[76] Inventor: Florian Gurbin, 331 Gosfield Ave., Essex, Ontario, Canada

[21] Appl. No.: 968,759

[22] Filed: Dec. 12, 1978

[51] Int. Cl.³ ............................................. B63H 3/04
[52] U.S. Cl. ................................... 415/148; 415/209; 415/217; 416/208; 416/212 R
[58] Field of Search ............... 415/148, 149 R, 149 A, 415/182, 208, 209, 216, 217; 416/207, 208, 212 R; 98/52–55

[56] References Cited

U.S. PATENT DOCUMENTS

| 2,382,535 | 8/1945 | Bauer | 416/208 |
| 2,947,466 | 8/1960 | Busquet | 415/149 |
| 3,294,175 | 12/1966 | Bodner | 416/208 |
| 3,567,340 | 3/1971 | Schneider | 416/208 |
| 4,009,520 | 3/1977 | Sukup | 98/55 |

Primary Examiner—Robert E. Garrett
Attorney, Agent, or Firm—Michael M. Sakovich

[57] ABSTRACT

Apparatus having radially disposed adjustable pitch fan blades embodies a split hub that is adapted to retain the blades in the plane of the hub. One portion of the hub includes an annular base with concentric upstanding inner and outer walls that define a channel. The outer wall includes a plurality of openings in which the blades are rotatably journalled with a cam portion of each blade extending into the channel. Cam follower means are slidably disposed in the channel and interlink adjacent cam portions so that rotation of any one blade will correspondingly adjust the pitch of each of the other blades. The blades are locked to a predetermined pitch setting by fastening the hub portions together. Another embodiment includes the fan blades and split hub which is bushed and secured to a shaft of a reversible drive motor. The fan and motor are mounted in a housing having open ends, an inlet end including air straightening means to improve air coupling with the fan blades and being adapted to fit a grain drying bin. The other end includes a shutter that is normally closed but which opens under air pressure to exhaust the air from the bin when the apparatus operates. Means are provided to hold open the shutter so that when the motor rotation is reversed, air may be blown into the bin.

8 Claims, 12 Drawing Figures

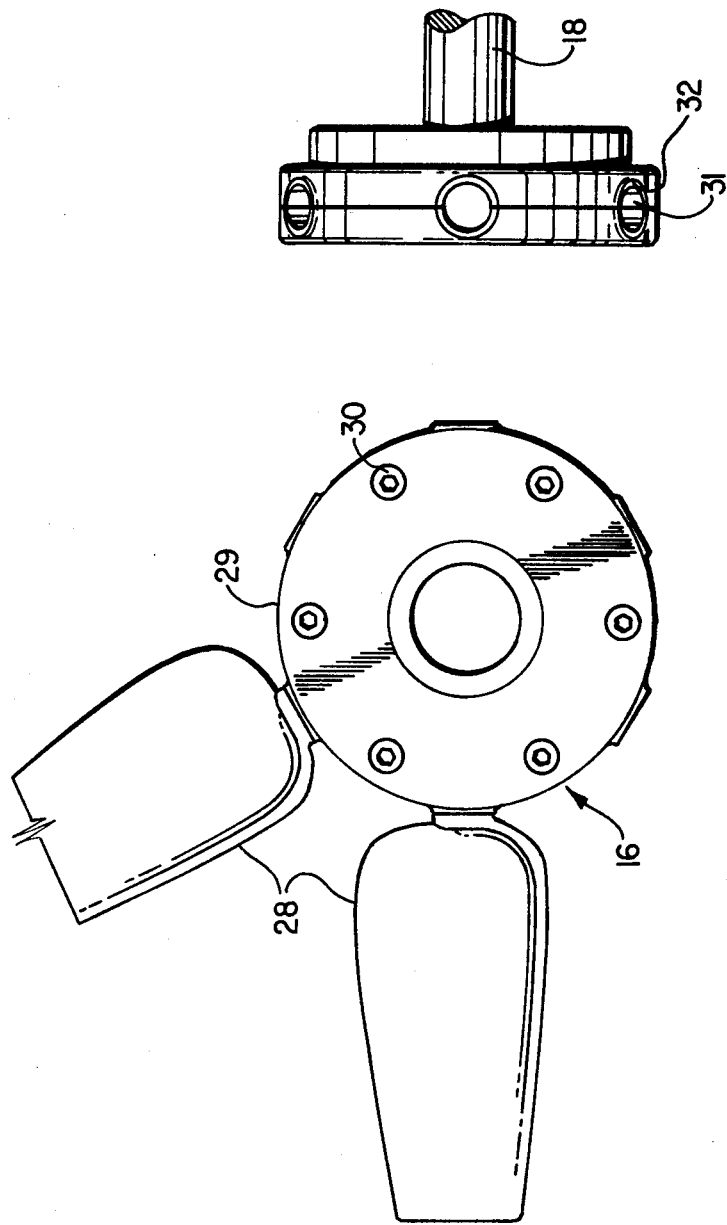

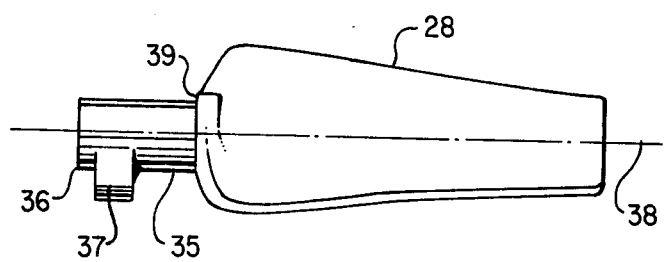
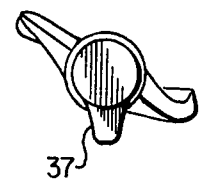
FIG. 4　　　　　　　　FIG. 5
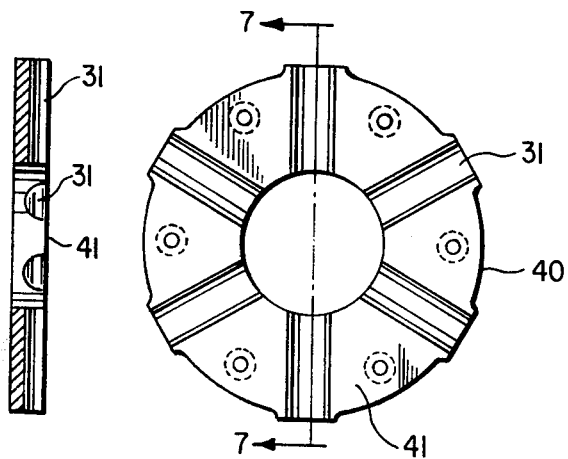
FIG. 7　　　FIG. 6

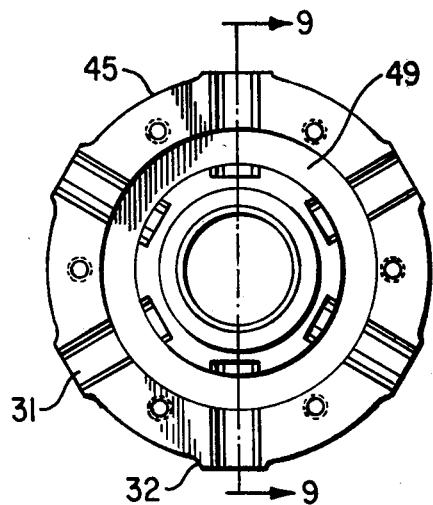
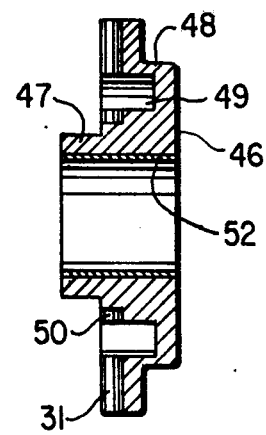
FIG. 8  FIG. 9
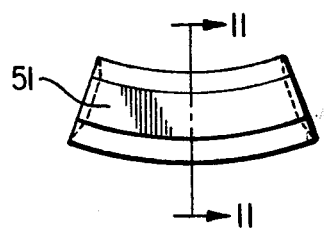
FIG. 10  FIG. 11
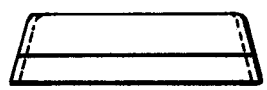
FIG. 12

ADJUSTABLE PITCH FAN

BACKGROUND OF THE INVENTION

This invention relates to fan apparatus and more particularly to fan apparatus having adjustable pitch blades.

The movement of fluids, notably air, is the principal application for a fan. Fans are therefore commonly used in systems requiring the movement of air for ventilation, heat transfer, moisture transportation and the like.

An agricultural application in which fan apparatus is beneficially used involves drying harvested grain crops and the like to improve the quality thereof and to correspondingly enhance its value. For example if corn is properly dried it is worth more since it may then be used in specialty markets such as prepared cereals.

The recognition of this fact has lead to various methods and apparatus for suitably drying grain products. One commonly used method is batch drying which utilizes an external heat source and a high speed fan in order to dry the grain expeditiously in the least possible time. The problem with drying grain using artificial heat sources where thermal output is high is that the dried grain is often damaged due to prolonged exposure to high temperatures. Thus, temperatures of from 110° to 200° F. cracks the skins of kernels making corn that is dried under these conditions unsuitable for running through special rollers which extract the delicate germ needed for processed food use.

A preferred method now in use dries corn naturally without incurring enormous costs involving vast amounts of heat energy. Storage bins, which are more or less conventional in structure, include an opening in a closed top of the bin through which air is drawn and conducted through the stored grain to the bottom of the bin where the air and its accumulated moisture is exhausted. Depending on the humidity content of the atmosphere, the air may be directly drawn into the bin or it may be slightly heated to control its moisture content. This may require warming the air slightly, probably not more than 5° F. higher than the ambient air temperature. Where the bin temperature is from 2° to 4° F. warmer than outside air, spoilage of the stored grain is reduced since fewer bacteria are formed.

Under such mild operating conditions, a reliable fan system is required since long periods of operation ensue. Drying time usually runs from harvest of the grain to the following January and February when the grain is normally sold and trucked away. Furthermore, the fan apparatus must be efficient in its operation in order to conserve electrical energy over the long period that it is operated, and it must be capable of matching the output to intake of air, particularly since loaded bins will vary in their characteristics due to the type of grain stored.

In order to maximize the efficiency of any fan apparatus, the fan blade portion thereof must be suitably coupled to its source of air to minimize slippage and to maximize air throughput. One way in which this may be performed includes a fan blade assembly having adjustable pitch blades. An alternative approach is to provide fan apparatus having variable drive means.

In the former case, ancillary problems arise which must be overcome if reliable apparatus is to be produced. Problems that are frequently encountered include blades that disengage from a hub and fly off due to strong centrifugal forces, irregular settings of individual blades which cause an unbalanced condition leading to excessive vibrations and resulting damage therefrom, and blades that are individually set which requires considerable time for accurate, uniform setting of all blades.

SUMMARY OF THE INVENTION

The principal object of the present invention is to provide adjustable pitch fan apparatus that is easily and readily set.

Another object of the invention is to provide adjustable pitch fan apparatus in which all of the blades are mechanically interlinked so that a pitch adjustment on one fan blade will correspondingly adjust each of the other blades within normally expected limits of manufacturing tolerances.

The invention also provides fan apparatus that is robust in structure and which includes means that minimize the possibility of individual fan blades breaking free from a hub.

The invention further provides means for improved coupling between the revolving fan blades and a mass of air to be moved in order to improve the efficiency of the fan apparatus.

The problems associated with the prior art may be substantially overcome and the objects and provisions of the invention achieved by recourse to an adjustable pitch fan apparatus herein described. The apparatus comprises a hub having an annular base with upstanding inner and outer walls concentrically disposed thereon defining a channel. A plurality of openings are equally spaced apart and are radially disposed in the outer wall. A like plurality of fan blades are radially disposed along the outer wall in the plane of the hub, with each blade having a stem rotatably journalled in a corresponding opening, an inner end, and a cam portion rotatably disposed in the channel. Cam follower means are slidably disposed in the channel and interlink adjacent pairs of the cams. Rotation of at least one blade accordingly rotates its cam and slidably displaces the cam follower means to rotate the other cams which correspondingly adjust the pitch of the blades.

DESCRIPTION OF THE DRAWINGS

The invention will now be more particularly described with reference to embodiments thereof shown, by way of example, in the accompanying drawings in which:

FIG. 2 is a plan view of a fan hub illustrating the position of fan blades mounted therein;

FIG. 3 is a side elevation view of the hub of FIG. 2;

FIG. 4 is a side elevation view of a fan blade illustrated in FIG. 2;

FIG. 5 is an end view of the fan blade;

FIG. 6 is a plan view of the inner side of a cover plate portion of the hub illustrated in FIGS. 2 and 3;

FIG. 7 is a sectional view taken along the lines 7—7 of the cover plate illustrated in FIG. 6;

FIG. 8 is an inside plan view of the other portion of the hub illustrated in FIGS. 2 and 3;

FIG. 9 is a sectional view taken along the lines 9—9 of the hub portion illustrated in FIG. 8;

FIG. 10 is a bottom plan view of a link member used in the present invention;

FIG. 11 is a sectional view taken along the lines 11—11 of the member illustrated in FIG. 10; and FIG. 12 is a side elevation view of the member of FIG. 10.

DESCRIPTION OF THE ILLUSTRATED EMBODIMENTS

Figure 1:
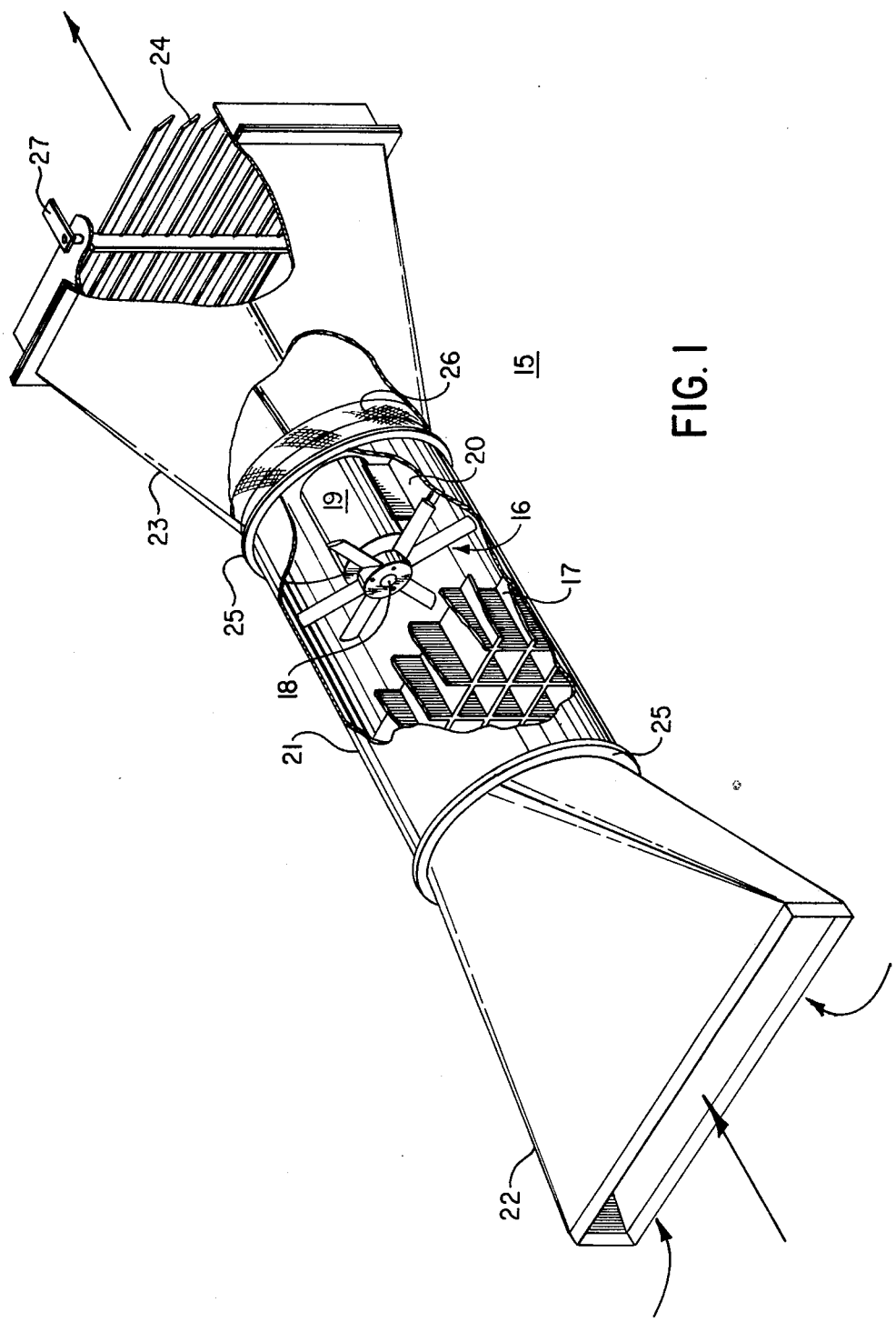
FIG. 1 is a perspective overall view of fan apparatus according to the invention showing portions cut away to better illustrate the disposition of internal components.

Referring now to the embodiments illustrated in the drawings, an adjustable pitch fan apparatus 15 is illustrated in FIG. 1 with portions of the apparatus removed to clearly show the disposition of components therein. Located upstream of a fan assembly 16 there will be observed a lattice structure 17 that is used to straighten swirling air ahead of the fan in order to improve the coupling between the assembly 16 and an air mass that is drawn into the apparatus 15. The direction of arrow lines appearing in FIG. 1 indicate the direction of air flow through the apparatus.

It will be understood that in the embodiment herein to be disclosed, the assembly 16 comprises six individual blades having an overall diameter of about 18 inches, the assembly being mounted on a shaft 18 of a reversible electric motor 19. In the present embodiment, the motor capacity can vary from between 3 to 5 HP depending on the particular load requirement; 60 cycle, 220 volt, single phase. In order to minimize vibrations, the motor 19 is mounted on a vibration damper mount 20 of a type that is not illustrated herein, but which is well known to those skilled in the art of mounting electric motors.

A central portion of the apparatus 15 includes the structure 17, together with the assembly 16 and the motor 19. It will be observed that the central portion comprises a housing 21 that defines a chamber for the foregoing components and which is provided with open ends for admitting and exhausting air that is drawn therethrough.

A tapered duct 22 leads from the upstream end of the housing 21 and converts such opening, which is circular in section, to a rectangular opening that can be more suitably arranged to feed through a wall of a drying bin (not shown) and to communicate the housing 21 with the interior of the bin.

At the downstream end of the housing 21, an outlet duct 23 conducts exhausted air through a shutter 24 to the atmosphere. Although not fully shown in the drawings, it will be understood that the shutter 24 comprises a plurality of horizontal blades that are pivotally mounted at their ends. The blades depend downwardly in overlapping relation to form a closure for the exhaust outlet of the duct 23 when the apparatus 15 is inoperative.

The ducts 22 and 23 are connected to respective ends of the housing 21 by means of adapters 25 which are plastic coated. This arrangement provides a discontinuity of similar material between the inlet and outlet of the housing which results in increased damping of vibrations and a reduction in the noise level of the apparatus, both of which are desirable features.

A plan view of the upstream end of the assembly 16 is illustrated in FIG. 2 showing only two fan blades 28. Reference also to FIG. 3 shows that the assembly 16 includes a fan hub 29 which is split into half portions that are held securely together by fastening means, Allen head screws 30 which threadably engage tapped holes in the hub. The side view in FIG. 3 further illustrates that the two half portions combine to form an outer wall of the hub 29 having a plurality of openings 31 that are spaced equally apart and which are radially disposed in the outer wall. A raised shoulder portion 32 circumscribes each of the openings 31 and provides a bearing surface against which each blade 28 abuts.

A more detailed view of a fan blade 28 is shown in a side elevation in FIG. 4. It will be noted therein that a base 39 of the blade abuts the shoulder portion 32 in the hub 29. Extending from the base 39 portion there will be seen a stem 35 which is cylindrical in form and which is adapted to be rotatably journalled in an opening 31. The stem terminates in an inner end 36 which is likewise cylindrical and is also journalled in the hub 29. Between the stem and inner end 36 is a cam portion 37, an end view of which is shown in FIG. 5. It will be observed that the portion 37 extends orthogonally to a long axis 38 of the blade 28.

An inner plan view of the half portion of the hub 29 illustrated in FIG. 2 is shown in FIG. 6 as a cover plate 40. The inner plan view shows in greater detail the openings 31 and lands 41 therebetween. A sectional view of the plate 40 taken along the lines 7—7 shows another view of these characterizing features in FIG. 7. Note that the openings 31 form grooves.

The other half portion of the hub 29 appears in FIG. 8. It will be observed that this portion is shown as an inner plan view of a hub member 45. A more complete understanding of the configuration of the member 45 may be seen by reference to FIG. 9 which is a cross sectional view thereof taken along the lines 9—9. It will be understood from these figures that the member 45 includes an annular base 46 which has upstanding inner and outer walls, 47 and 48, respectively, which are concentrically disposed thereon and which define a channel 49. A bushing 52 is fixed coaxially with the inner wall 47 and is adapted to be mounted on the shaft 18.

The openings 31 are to be found in the outer wall 48. It will be appreciated that the wall 48 may be configured to fully define each of the openings 31. However, in the embodiment illustrated it will be observed that each of the openings 31 is defined by the wall 48 and a corresponding portion of the plate 40. Thus, when the respective halves of the hub 29 are joined together, the openings 31 and corresponding grooves are formed and define journals for the stem 35 of each fan blade 28.

Additional support for each fan blade 28 is provided by the inner end 36 which is similarly journalled in a recess 50 that is formed in the inner wall 47 in line with its opening 31. Each fan blade 28 is thus supported by its stem 35 and inner end 36 in such a manner as to allow the cam portion 37 to extend into the channel 49 where it is held to prevent the fan blade 28 from breaking free of the hub 29.

It will be understood that reference to the cam portion 37 includes such portions having cam surfaces of virtually any shape that will operate to achieve the objects of the invention herein described. In the embodiment illustrated in FIGS. 4 and 5, the portion 37 is in fact equivalent to a gear tooth which is adapted to engage cam follower means that are slidably disposed in the channel 49 and which interlink adjacent pairs of such gear teeth.

The foregoing cam follower means are embodied in the present invention as a plurality of rigid link members 51, one of which is illustrated in FIGS. 10, 11 and 12. FIG. 10 is a bottom plan view of the member 51, with FIG. 11 representing a cross sectional view thereof taken along the lines 11—11, and FIG. 12 showing the ends of the member 51 which are sloped to provide a complementary fit with the corresponding sloping sides of the cam portion 37.

One member 51 is disposed in the channel 49 between each pair of cam portions 37. Thus, when the fan assembly 16 is fully assembled, the members 51 interlink all the cam portions 37 so that a rotary movement of any blade 28 will impart a longitudinal displacement of its corresponding link member 51 which in turn will act on the adjacent cam portion 37 to rotate the fan blade thereof a corresponding amount. This effect is repeated for each fan blade of the assembly and results in substantially the same pitch adjustment for each of the blades. Thereafter, the plate 40 is locked securely to the member 45 by means of the screws 30 of FIG. 2 causing the respective stems 35, ends 36, cam portions 37 and members 51 to lock together in order to maintain the pitch setting. While this adjustment may be done merely by rotating one of the blades 28, it has been found that in practice the procedure is facilitated by twisting a pair of diametrically opposed blades in opposite directions.

The shutter 24 has been provided as a safety guard and to prevent entry of rodents when the apparatus 15 is inoperative. Moreover, the shutter 24 provides a means for directing air exhausted from the bin depending on the shutter position. In the event that this latter feature is not required, a screen 26 fabricated from expanded metal mesh may be fitted downstream of the motor 19 as shown in the cutaway view of FIG. 1. The shutter 24 may then be omitted as a cost saving feature.

A vertically positionable latch 27, known in the art, is pivotably linked to each blade of the shutter 24 in order to hold open the shutter when rotation of the motor 19 is reversed. Air may then be blown into the bin to humidify grain stored therein.

Having regard to the description and illustrations of the present invention, it will be apparent to those skilled in the art that variations thereof within the scope of the invention are readily feasible. For example fewer or greater numbers of fan blades may be used. Accordingly, the disclosed and illustrated embodiments herein should be considered as exemplary rather than restrictive of the invention which is defined in the accompanying claims.

What I claim is:

1. Adjustable pitch fan apparatus comprising:
   a hub having an annular base with upstanding inner and outer walls concentrically disposed thereon defining a channel;
   a plurality of openings equally spaced apart and radially disposed in the outer wall;
   a plurality of fan blades radially disposed along the outer wall in the plane of the hub, each blade having a stem rotatably journalled in a corresponding opening, an inner end, and a cam rotatably disposed in the channel; and
   a plurality of discrete rigid link members freely disposed in the channel and slidably interlinking adjacent pairs of cams, individual ones of said members being curved to conform to the channel and interposed between the cams of adjacent pairs of fan blades whereby rotation of at least one blade rotates its cam and slidably displaces said link members to rotate the other cams which correspondingly adjust the pitch of the blades.

2. Apparatus as claimed in claim 1 further comprising locking means for fixedly securing the fan blades at the adjusted pitch.

3. Apparatus as claimed in claim 2 further comprising a bushing fixed coaxially with the inner walls and adapted to be mounted on a rotatable shaft.

4. Apparatus as claimed in claim 3 wherein the locking means comprise a cover plate disposed coaxially with the hub, said plate covering the channel and frictionally engaging and clamping the stem of each fan blade between the plate and hub, and fastening means securely locking said plate to the hub.

5. Apparatus as claimed in claim 4 wherein the cover plate includes radially disposed grooves, individual ones of which frictionally engage the stem of a corresponding fan blade.

6. Apparatus as claimed in claim 5 wherein the inner wall of the hub includes radially disposed grooves, individual ones of which frictionally engage and rotatably support the inner end of a corresponding fan blade.

7. Apparatus as claimed in claim 6 wherein the cam of each fan blade comprises a gear tooth projecting orthogonally to the long axis of the blade and the free ends of each link member are sloped to provide complementary engagement with respective ones of the gear teeth.

8. Apparatus as claimed in claim 7 further comprising a reversible drive motor having a shaft on which the bushing is mounted.

* * * * *